(12) United States Patent
Shinoda et al.

(10) Patent No.: US 11,498,795 B2
(45) Date of Patent: Nov. 15, 2022

(54) SHEET STACKING TRAY, SHEET STACKING APPARATUS, AND IMAGE FORMING SYSTEM

(71) Applicants: Atsushi Shinoda, Kanagawa (JP); Naoki Oikawa, Kanagawa (JP)

(72) Inventors: Atsushi Shinoda, Kanagawa (JP); Naoki Oikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/396,937

(22) Filed: Aug. 9, 2021

(65) Prior Publication Data

US 2022/0055855 A1 Feb. 24, 2022

(30) Foreign Application Priority Data

Aug. 24, 2020 (JP) .............................. JP2020-141037

(51) Int. Cl.
| | |
|---|---|
| *B65H 31/28* | (2006.01) |
| *B65H 43/06* | (2006.01) |
| *H04N 1/00* | (2006.01) |
| *B65H 37/06* | (2006.01) |
| *B65H 31/24* | (2006.01) |
| *B65H 31/02* | (2006.01) |

(52) U.S. Cl.
CPC .............. *B65H 43/06* (2013.01); *B65H 31/02* (2013.01); *B65H 31/24* (2013.01); *B65H 37/06* (2013.01); *H04N 1/00631* (2013.01); *H04N 1/00639* (2013.01)

(58) Field of Classification Search
CPC ............... B65H 31/28; B65H 29/6618; B65H 29/6627; B65H 2301/4219
See application file for complete search history.

(56) References Cited

U.S. PATENT DOCUMENTS

| | | | | |
|---|---|---|---|---|
| 4,805,890 A | * | 2/1989 | Martin ................... | B65H 29/16 414/793.1 |
| 6,332,606 B1 | * | 12/2001 | Seki ....................... | B65H 29/60 270/58.11 |
| 6,398,010 B1 | * | 6/2002 | Fangmeier ............. | B65H 29/68 198/462.1 |

(Continued)

FOREIGN PATENT DOCUMENTS

| | | |
|---|---|---|
| JP | 2013-001526 | 1/2013 |
| JP | 2013-082544 | 5/2013 |
| JP | 2014-015284 | 1/2014 |

*Primary Examiner* — Leslie A Nicholson, III
(74) *Attorney, Agent, or Firm* — Harness, Dickey & Pierce, P.L.C.

(57) ABSTRACT

A sheet stacking tray includes a first conveyor, a second conveyor, a sheet stopper, a first full-load detector, a second full-load detector, and a plurality of motors. The plurality of motors maintain the sheet stopper at a protruding position to block a sheet conveyed by the first conveyor until the first full-load detector outputs a signal indicating that a sheet bundle is fully loaded, shift the sheet stopper to a lowered position to allow the sheet bundle to pass when the first full-load detector outputs the signal indicating that the sheet bundle is fully loaded, drive the first conveyor and the second conveyor together to convey the sheet bundle when the sheet stopper shifts to the lowered position, and stop the second conveyor and drive only the first conveyor, when the second full-load detector detects a leading edge of the sheet bundle.

9 Claims, 16 Drawing Sheets

(56) References Cited

U.S. PATENT DOCUMENTS

| | | | | |
|---|---|---|---|---|
| 6,817,608 B2* | 11/2004 | Sloan, Jr. | ............... | B65H 29/16 |
| | | | | 271/216 |
| 7,635,121 B2* | 12/2009 | Dobashi | ................ | B65H 43/02 |
| | | | | 270/32 |
| 7,677,544 B2* | 3/2010 | Awano | ................... | B65H 31/28 |
| | | | | 270/58.11 |
| 7,681,872 B2* | 3/2010 | Hayashi | ............. | G03G 15/6538 |
| | | | | 270/32 |
| 7,862,027 B2* | 1/2011 | Dobashi | ............. | B65H 29/6645 |
| | | | | 270/32 |
| 7,959,145 B2* | 6/2011 | Dobashi | ............. | B65H 29/6645 |
| | | | | 270/32 |
| 8,616,542 B2* | 12/2013 | Min | ................... | B65H 29/6609 |
| | | | | 270/32 |
| 8,931,773 B2* | 1/2015 | Sugiyama | ............. | B65H 39/00 |
| | | | | 270/32 |
| 11,001,467 B2* | 5/2021 | Hanamoto | ............. | B65H 31/02 |
| 11,021,340 B2* | 6/2021 | Kishimoto | ............. | B65H 37/04 |
| 2012/0083400 A1 | 4/2012 | Shibasaki et al. | | |
| 2012/0086161 A1 | 4/2012 | Nagasako et al. | | |
| 2014/0011656 A1 | 1/2014 | Niikura et al. | | |
| 2014/0339761 A1 | 11/2014 | Oikawa et al. | | |
| 2015/0145199 A1 | 5/2015 | Yoshida et al. | | |
| 2020/0299081 A1 | 9/2020 | Waragai et al. | | |

* cited by examiner

SHEET STACKING TRAY, SHEET STACKING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2020-141037, filed on Aug. 24, 2020 in the Japan Patent Office, the entire disclosure of which is hereby incorporated by reference herein.

BACKGROUND

Technical Field

Embodiments of the present disclosure relate to a sheet stacking tray for stacking folded sheets in a bundle.

Description of the Related Art

There is known an image forming system connecting an image forming apparatus that forms an image on a sheet-shaped recording medium and a post-processing apparatus that performs predetermined post-processing on the recording medium (sheet) on which the image has been formed. There is also known a sheet stacking apparatus that folds a sheet on which an image has been formed and ejected from the image forming apparatus and conveys the sheet after the folding process so that a folded portion (hereinafter referred to as "portion") of the sheet on which the folding process has been performed is a leading end of the sheet, thereby stacking the sheets that have gone through the folding process on a sheet stacking tray in a bundled state.

Further, there is known a technology for facilitating to recognize a boundary between print jobs after a double-folded booklet formed by a plurality of print jobs or sheets subjected to various folding processes are ejected to a single tray. There is also known a configuration in which a distance equal to or greater than a predetermined distance is provided between a sheet or a sheet bundle ejected in advance and a sheet or a sheet bundle ejected afterward.

SUMMARY

In an embodiment of the present disclosure, a sheet stacking tray includes a first conveyor, a second conveyor, a sheet stopper, a first full-load detector, a second full-load detector, and a plurality of motors. The first conveyor sequentially conveys a plurality of sheets ejected to the sheet stacking tray, in a sheet conveyance direction to form a sheet bundle. The second conveyor is disposed downstream from the first conveyor in the sheet conveyance direction. The sheet stopper is pivotable between a protruding position and a lowered position and blocks the plurality of sheets conveyed by the first conveyor to form the sheet bundle when the sheet stopper is at the protruding position. The sheet stopper allows the formed sheet bundle to pass when the sheet stopper is at the lowered position. The first full-load detector detects that the sheet bundle blocked by the sheet stopper is fully loaded. The second full-load detector detects that a leading edge of the sheet bundle conveyed by the second conveyor has reached a downstream end portion of the second conveyor in the sheet conveyance direction. The plurality of motors maintain the sheet stopper at the protruding position to block the sheet conveyed by the first conveyor until the first full-load detector outputs a signal indicating that the sheet bundle is fully loaded, shift the sheet stopper to the lowered position to allow the sheet bundle to pass when the first full-load detector outputs the signal indicating that the sheet bundle is fully loaded, drive the first conveyor and the second conveyor together to convey the sheet bundle when the sheet stopper shifts to the lowered position, and stop the second conveyor and drive only the first conveyor, when the second full-load detector detects the leading edge of the sheet bundle.

In another embodiment of the present disclosure, a sheet stacking apparatus includes the sheet stacking tray and a controller to control driving of the first conveyor, the second conveyor, and the sheet stopper of the sheet stacking tray.

In still another embodiment of the present disclosure, an image forming system includes an image forming apparatus for forming an image on a sheet, a post-processing apparatus for folding the sheet on which the image has been formed by the image forming apparatus, and the sheet stacking apparatus for stacking the sheet folded by the post-processing apparatus.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
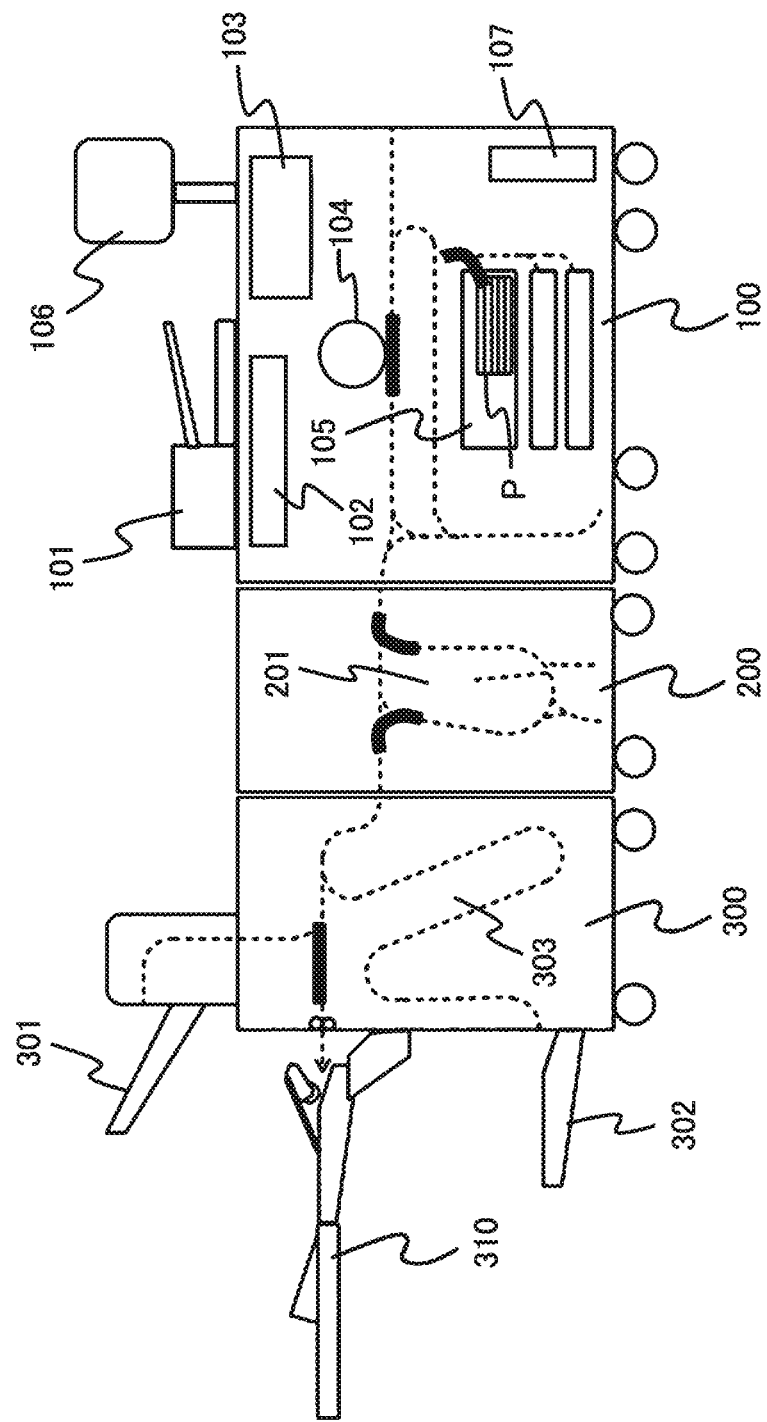
FIG. 1 is a schematic view of an image forming system including a sheet stacking apparatus, according to an embodiment of the present disclosure.

The accompanying drawing are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawing, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

A sheet stacking tray, a sheet stacking apparatus, and an image forming system according to an embodiment of the present disclosure is described below with reference to the drawings.

FIG. 1 is a schematic diagram illustrating an overall configuration of an image forming system 1 including a sheet stacking apparatus according to the present embodiment.

The image forming system 1 includes an image forming apparatus 100 for forming an image on a sheet-shaped recording medium, a folding apparatus 200 for performing predetermined folding processes on sheets conveyed from the image forming apparatus 100, and a post-processing apparatus 300 for ejecting the folded sheets conveyed from the folding apparatus 200 using predetermined conveyance paths. The post-processing apparatus 300 and the folding apparatus 200 are connected to each other so as to communicate with each other. In the present embodiment, the "sheet" corresponds to a sheet-shaped recording medium. For example, "paper" corresponds to one type of the sheet-shaped recording medium. In the following description, the sheet is not limited to the "sheet" as long as the sheet can be conveyed when processing is performed in the image forming system 1 and can be subjected to folding process and stacking process.

The image forming apparatus 100 includes a document reader 101, an image processing device 102, an image writing device 103, an image forming device 104, a sheet feeding tray 105, an operation panel 106, and a main controller 107. The main controller 107 controls overall operation of the image forming system 1 and has a communication function of transmitting and receiving information to and from a controller 317 described later.

The operation panel 106 includes a display screen for displaying a response status for an operation made by a user. When a "start key" on the operation panel 106 is pressed or touched, printing process as an image forming process is started. For example, when a document placed on the document reader 101 is to be copied, first, the placed document is optically read by an optical reading sensor included in the document reader 101, and a photoelectrically converted signal is output to the image processing device 102. The read signal is subjected to, for example, analog processing, analog to digital (A/D) conversion, shading correction, image compression in the image processing device 102, and then stored in the image writing device 103. A semiconductor laser is driven to emit light based on an image data stored in the image writing device 103 and the photoconductor drum of the image forming device 104 is irradiated with laser light to form a latent image.

Then, the latent image is developed with toner by the image forming device 104, and the toner image is transferred by the image forming device 104 onto a sheet supplied from a sheet supply tray 105. The sheet to which the toner image has been transferred is subjected to fixing process by a fixing device, and then ejected to the folding apparatus 200 connected to the post-processing apparatus 300 as a subsequent device. Thus, an image is formed on the sheet by the printing process described above.

A sheet on which an image has been formed by the image forming apparatus 100 is conveyed into the folding apparatus 200, and then the sheet passes through one of the conveyance paths branched into two. A folding device 201 is disposed on one of the two conveyance paths, and a sheet passing through the folding device 201 is subjected to folding process based on a setting input on the operation panel 106. The folding process includes, for example, folding into two, folding into three, folding into Z-shape, and the sheet that has gone through the folding process is ejected to the post-processing apparatus 300 as the subsequent device. The folding device 201 is not disposed on the other conveyance path, and the sheet conveyed to the other conveyance path is ejected to the post-processing apparatus 300 without going through the folding process.

The post-processing apparatus 300 includes attachments such as an upper tray 301, a sheet stacking tray 310 as a sheet stacking apparatus, and a lower tray 302. The upper tray 301, the lower tray 302, and the sheet stacking tray 310 are disposed on a lateral side of the post-processing apparatus 300. The sheet stacking tray 310 is disposed between the upper tray 301 and the lower tray 302 in the vertical direction on a lateral side of the post-processing apparatus 300. The sheet ejected from the folding apparatus 200 is guided to one of the three conveyance paths branching inside the post-processing apparatus 300, and is ejected to the corresponding one of the upper tray 301, the sheet stacking tray 310, and the lower tray 302. For example, among the sheets ejected from the folding apparatus 200, sheets that require the binding process are guided to a lower conveyance path. When the sheets pass through the binding device 303 disposed along the lower conveyance path, the binding process to bind a predetermined number of sheets is performed. Then, the sheets are ejected to the lower tray 302. A sheet that has gone through the folding process and does not require the binding process passes through an upper conveyance path and is ejected to the upper tray 301. A sheet that has gone through the folding process such as Z-folding and does not require the binding process passes through a conveyance path between the conveyance path toward the lower tray 302 and the conveyance path toward the upper tray 301 and is ejected to the sheet stacking tray 310.

Figure 2:
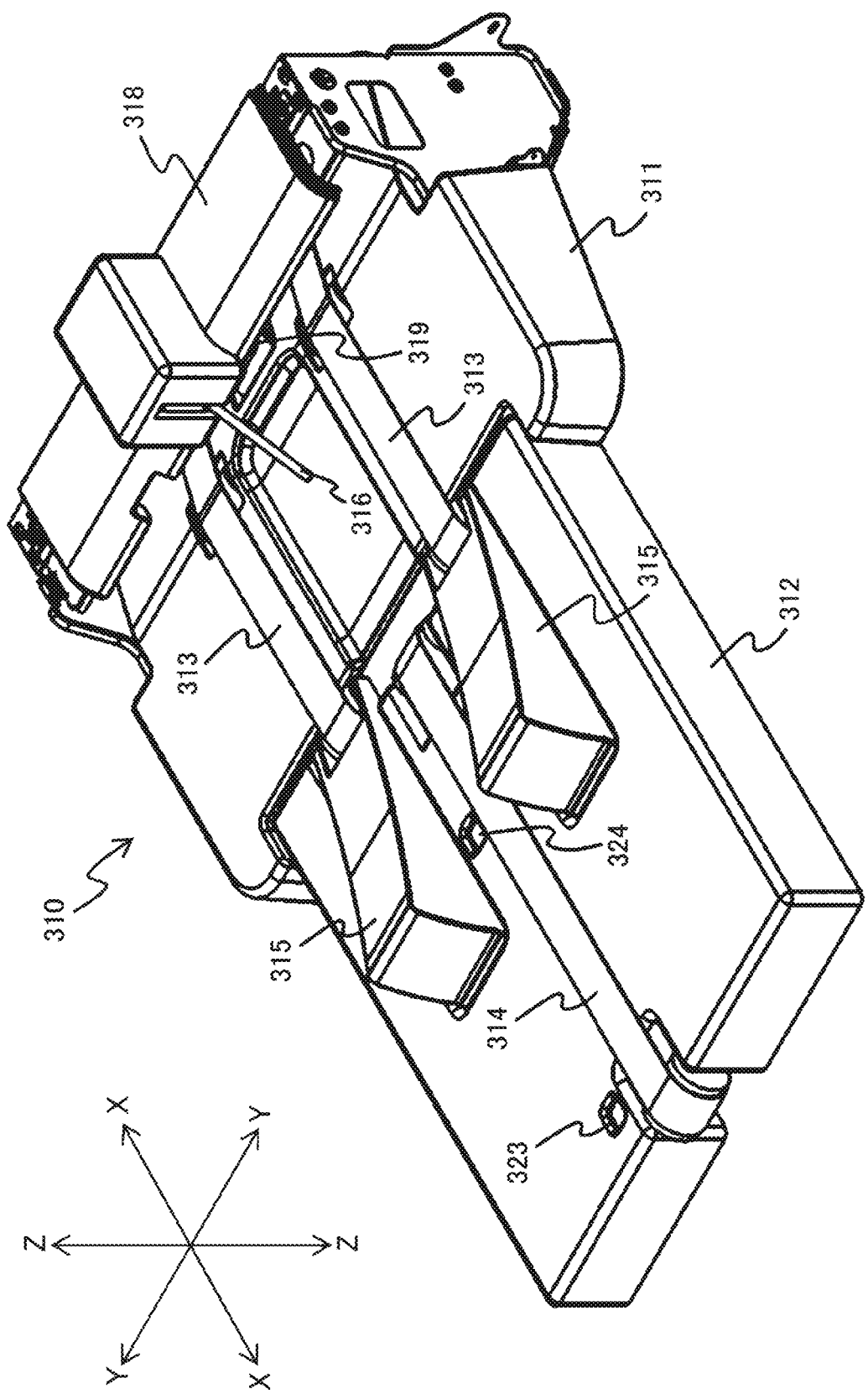
FIG. 2 is a perspective view of a sheet stacking tray provided for a sheet stacking apparatus, according to an embodiment of the present disclosure.

FIG. 2 is a perspective view of the sheet stacking tray 310 according to the present embodiment.

Figure 3:
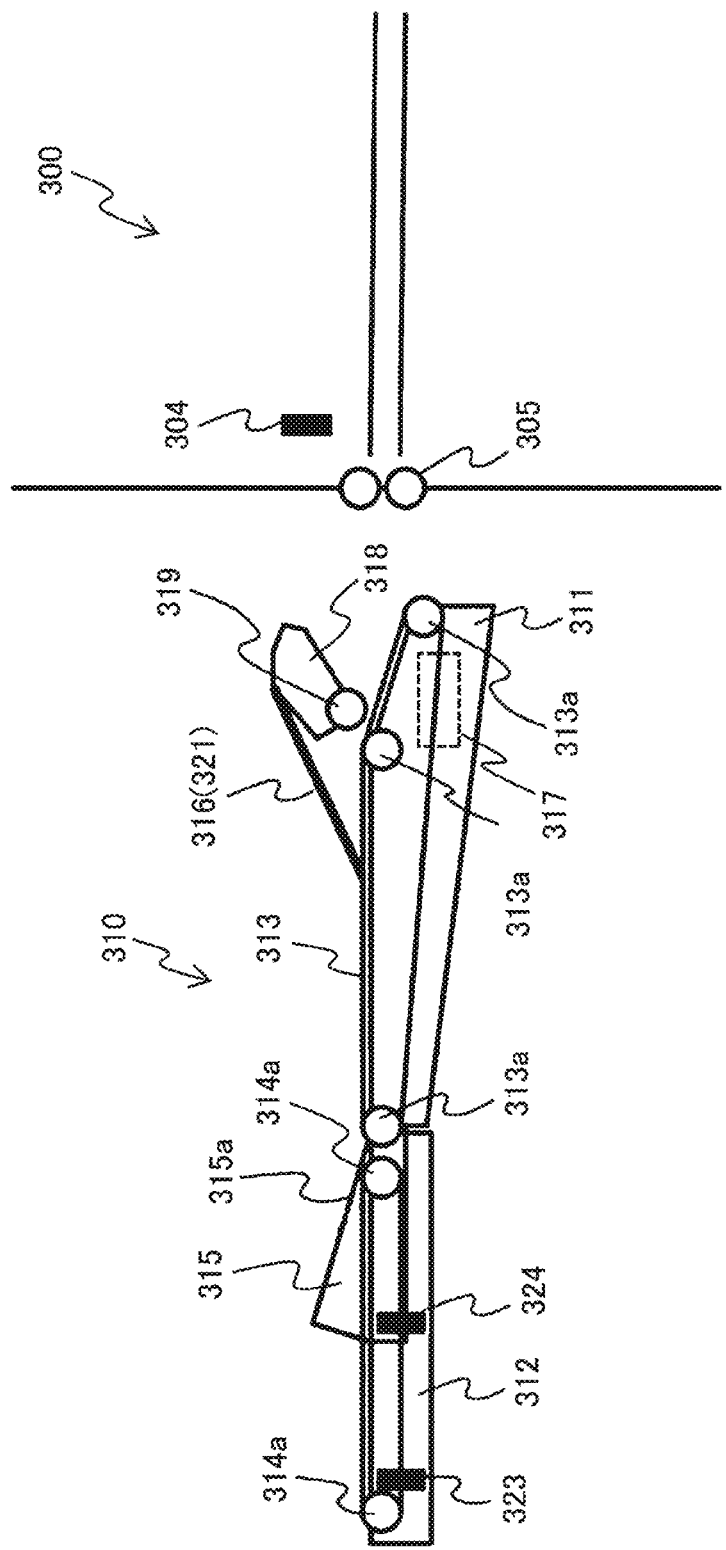
FIG. 3 is a vertical sectional view of a sheet stacking tray and an area around a sheet ejection unit of a post-processing apparatus, according to an embodiment of the present disclosure.

FIG. 3 is a vertical sectional view of the sheet stacking tray 310 and an area around a sheet ejection portion of the post-processing apparatus 300 according to the present embodiment.

As illustrated in FIG. 3, the sheet ejection portion of the post-processing apparatus 300 includes an ejection port sensor 304 and an ejection roller pair 305. A sheet that has passed through the conveyance path inside the post-processing apparatus 300 and has been folded having a predetermined thickness, is ejected onto the sheet stacking tray 310 by the ejection roller pair 305 after the arrival of the sheet is detected by the ejection port sensor 304. As illustrated in FIGS. 2 and 3, the sheet stacking tray 310 includes an output tray 311, an extension tray 312, a pair of first conveyance belts 313, a second conveyance belt 314, a pair of sheet stoppers 315, a sheet surface detector 316, and a controller 317. As illustrated in FIG. 2, in the following description, a sheet conveyance direction is defined as an X direction, a width direction of the sheet orthogonal to the X direction is defined as a Y direction, and a up-and-down direction orthogonal to the X direction and the Y direction and corresponding to a vertical direction is defined as a Z direction.

The output tray 311 is a first stacking unit to stack a predetermined amount of folded sheets ejected from the post-processing apparatus 300 such that the folded sheets partially overlap each other. The extension tray 312 is a second stacking unit on which a predetermined amount of sheet bundle Pb moving from the output tray 311 is placed when the amount of sheets stacked on the output tray 311 exceeds a predetermined amount. The output tray 311 and the extension tray 312 are continuously arranged in the ejection direction of the sheet bundle Pb. In the present embodiment, the ejection direction of the sheet bundle Pb is equivalent to the X direction and the horizontal direction. The extension tray 312 is pivotably attached to the output tray 311. A leading end portion of the extension tray 312 in the sheet conveyance direction pivots about an axis in the Y direction constituting a joint portion with the output tray 311. Pivoting the extension tray 312 allows the extension tray 312 to be folded toward the output tray 311 and stored.

The first conveyance belt 313 as a first conveyor is stretched around three drive rollers 313a incorporated in the output tray 311, and is rotatable by a first motor described later as a drive source. A pair of first conveyance belts 313 are provided at positions located by a predetermined interval in the width direction (Y direction) of the output tray 311. The sheet bundle Pb that has been folded and ejected from the post-processing apparatus 300 sequentially moves on the output tray 311 downstream in the sheet conveyance direction (X direction) by the pair of first conveyance belts 313.

The second conveyance belt 314 as a second conveyor is stretched between two driving rollers 314a incorporated in the extension tray 312. The second conveyance belt 314 is rotatable by a second motor described later as a driving source. The second conveyance belt 314 is disposed on an extension line between the pair of first conveyance belts 313. The folded sheet bundle having passed through the pair of first conveyance belts 313 is sequentially moved on the extension tray 312 toward downstream in the conveyance direction (X direction) by the second conveyance belt 314.

The pair of sheet stoppers 315 are provided in an area around the connecting portion of the extension tray 312 with the output tray 311 and is pivotable between a protruding position and a lowered position by a third motor described later as a driving source. A position detection element, which is described later, is provided in an area around the pair of sheet stoppers 315. The position detection element can detect whether the pair of sheet stoppers 315 are at the protruding position or the lowered position. The two sheet stoppers 315 are arranged at positions facing the end portions of the pair of first conveyance belts 313 downstream in the sheet conveyance direction, and the second conveyance belt 314 is disposed between the pair of sheet stoppers 315.

Each of the sheet stoppers 315 include a receiving surface 315a functioning as a stopper of the sheet. When the pair of sheet stoppers 315 are at the protruding position, the receiving surfaces 315a face the ends of the first conveyance belts 313 in a backward inclined posture. Accordingly, the sheet bundle conveyed by the first conveyance belts 313 is blocked at a position in front of the extension tray 312. On the other hand, when the pair of sheet stoppers 315 are at the lowered position, the receiving surfaces 315a are in a parallel posture at a substantially equivalent height as the first conveyance belts 313. Accordingly, the sheet bundle conveyed by the first conveyance belts 313 passes along the receiving surfaces 315a of the pair of sheet stoppers 315 and is allowed to move to the extension tray 312. The pair of sheet stoppers 315 stop the sheet conveyed on the ejection roller pair 305 by friction with the receiving surfaces 315a. However, the present embodiment is not limited to such a configuration. For example, a portion that receives the sheet may be formed in a stepped shape, and abutting the sheet against the step may block the sheet.

The sheet surface detector 316 that serves as the first fill-load status detector detects an upper limit of stacking of the sheet bundle Pb on the output tray 311. The sheet surface detector 316 protrudes from a cover 318 which covers an upstream end portion of the output tray 311 in the sheet conveyance direction. Inside the cover 318, an auxiliary roller 319 that faces one driving roller 313a for driving the first conveyance belt 313 is provided. The driving roller 313a and the auxiliary roller 319 constitute a sheet conveyance roller. The driving roller 313a and the auxiliary roller 319 are simultaneously driven at the same speed by a first motor in common.

Figure 4:
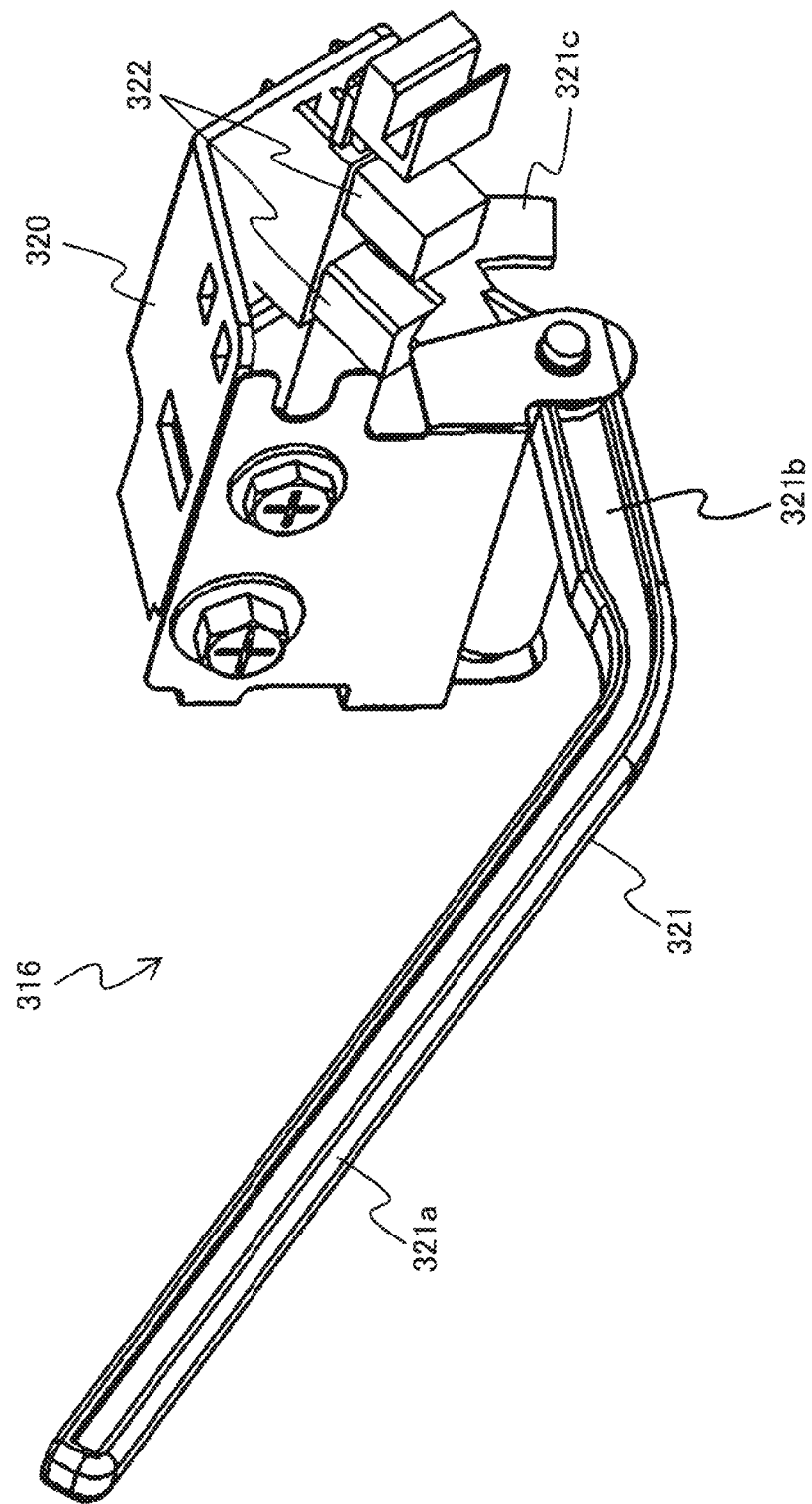
FIG. 4 is a perspective view of a sheet surface detector provided for a sheet stacking tray, according to an embodiment of the present disclosure.

FIG. 4 is a perspective view of the sheet surface detector 316 according to the present embodiment.

As illustrated in FIG. 4, the sheet surface detector 316 includes a bracket 320 provided inside the cover 318, a detection jogger 321 pivotably supported by the bracket 320, and a full-load detection sensor 322 mounted on the bracket 320. The detection jogger 321 is formed of a rod-shaped member in which a long portion 321a and a short portion 321b are continuously bent, and a shielding plate 321c is attached to a rear end of the short portion 321b. The detection jogger 321 is pivotable about the rear end of the short portion 321b as a fulcrum, and the long portion 321a protruding from the cover 318 is biased by its own weight in a direction of coming into contact with the upper surface of the output tray 311.

The full-load detection sensor 322 is a transparent optical sensor in which a light-emitting portion and a light-receiving portion face each other via a slit, and a shielding plate 321c moves in and out of the slit of the full-load detection sensor 322 as the detection jogger 321 swings. More specifically, when the long portion 321a of the detection jogger 321 is in contact with the upper surface of the output tray 311, the shielding plate 321c is located at a position away from the slit, and the full-load detection sensor 322 does not output an operation signal. When the long portion 321a is gradually lifted by the sheet bundle Pb blocked by the pair of sheet stoppers 315 and the shielding plate 321c enters the slit accordingly, an optical path from the light emitting portion to the light receiving portion of the full-load detection sensor 322 is blocked at that point in time. Thus, an operation signal indicating that sheet bundle (Pb) is fully loaded and has reached the upper limit is output.

As the full-load detection sensor 322, any detection element such as a position detection switch and a magnetic sensor other than the transmissive optical sensor can be used as long as the detection element can detect the upper limit of the output tray 311 to stack the sheet bundle Pb. An angle detection element such as a rotary encoder may be used as the full-load detection sensor 322 to continuously detect not only the upper limit of the stackable sheet bundle Pb but also a stacking state before reaching the full-load state.

A first sheet detection element 323 is disposed downstream in the sheet conveyance direction of the second conveyance belt 314 of the extension tray 312 as a second full-load status detector. The first sheet detection element 323 is a reflective optical sensor, and the extension tray 312 includes a hole through which the light emitted from the first sheet detection element 323 and the reflected light thereof pass. When a leading one of the sheets P sequentially conveyed by the second conveyance belt 314 reaches the leading end of the extension tray 312, the first sheet detection element 323 receives the light reflected by the sheet and outputs an operation signal.

A second sheet detection element 324 that serves as a remaining sheet detector is disposed on the extension tray 312 upstream in the sheet conveyance direction of the second conveyance belt 314. The second sheet detection element 324 is also a reflective optical sensor, and the extension tray 312 includes a hole through which the light emitted from the second sheet detection element 324 and reflected light thereof pass. The second sheet detection element 324 outputs an operation signal when the pair of sheet stoppers 315 shift to the lowered positions at which a sheet bundle Pb is allowed to pass through and the sheet bundle Pb is stacked on the pair of sheet stoppers 315. However, when the sheet bundle Pb on the pair of sheet stoppers 315 is removed, the reflected light from the sheet disappears and the operation signal is not output from the second sheet detection element 324.

Figure 5:
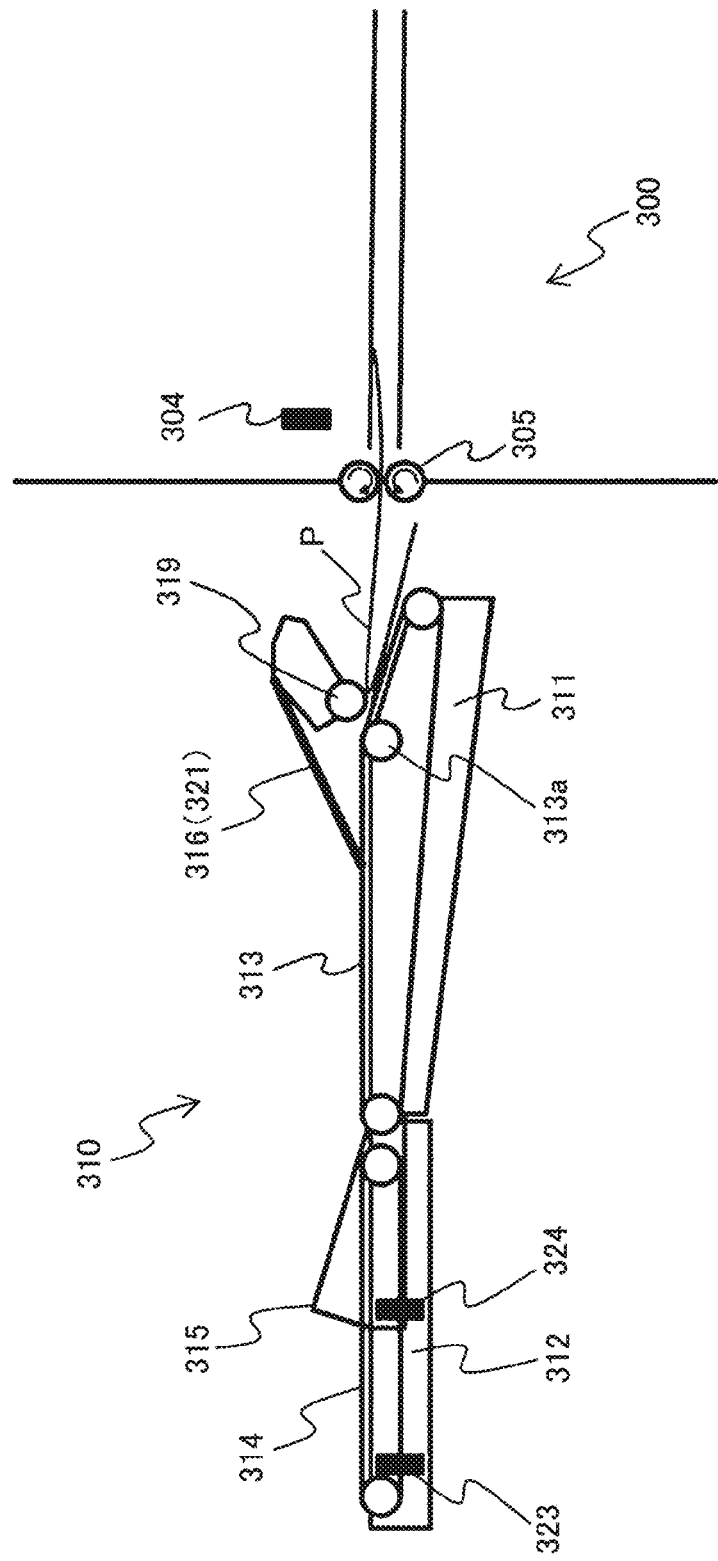
FIG. 5 is a vertical sectional view of a sheet stacking tray and an area around a sheet ejection unit of a post-processing apparatus, and is a diagram illustrating how a first sheet is ejected to an output tray of the sheet stacking tray, according to an embodiment of the present disclosure.
Figure 6:
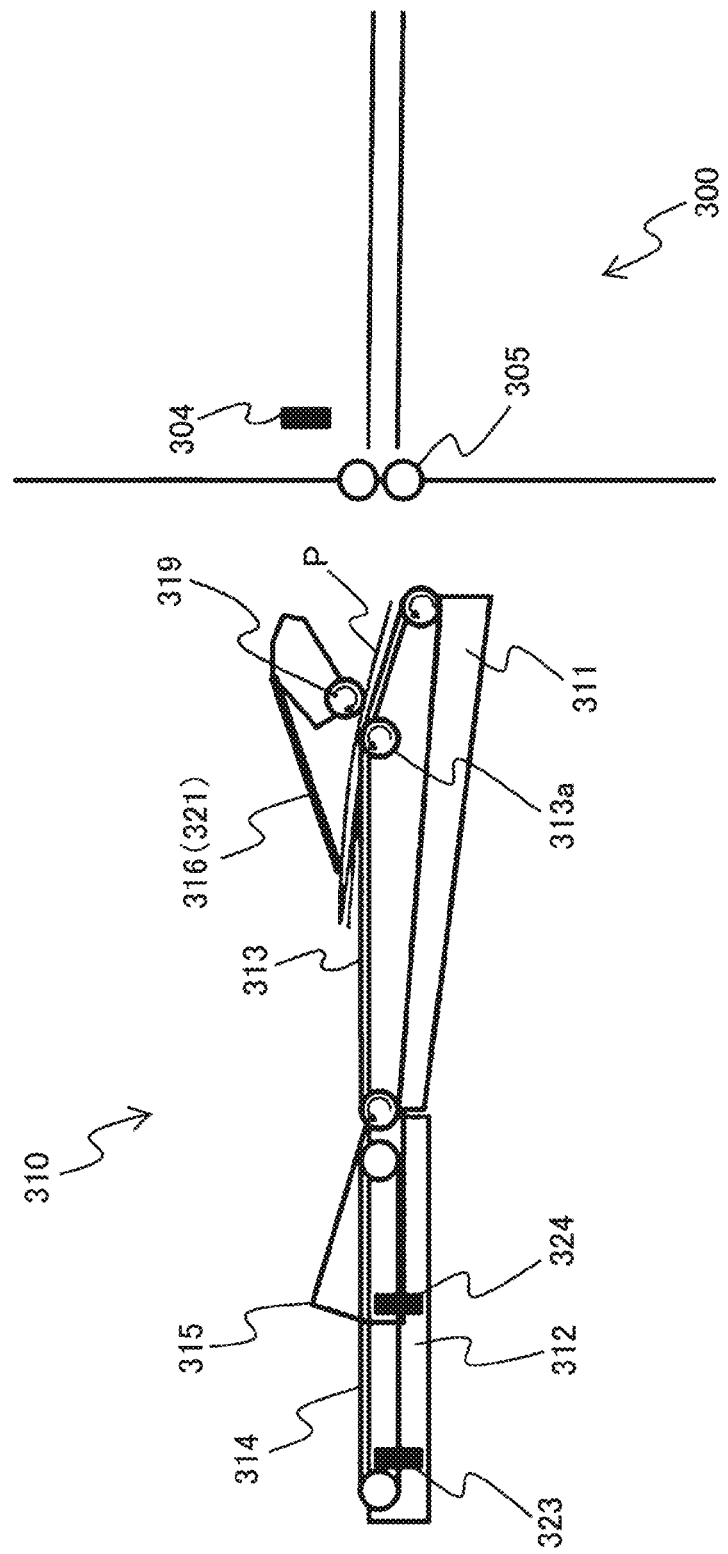
FIG. 6 is a vertical sectional view of a sheet stacking tray and the vicinity of a sheet ejection unit of a post-processing apparatus in which a first sheet is conveyed to an output tray of the sheet stacking tray, according to an embodiment of the present disclosure.

Next, a state in which a sheet handle Pb is continuously stacked on the sheet stacking tray 310 is described with reference to FIGS. 5 to 13. FIGS. 5 and 6 are diagrams illustrating how a first sheet P is conveyed according to the present embodiment. The sheet P that has gone through the folding process by the folding apparatus 200 passes through a conveyance path inside the post-processing apparatus 300. Then, the sheet P is ejected from the post-processing apparatus 300 to the output tray 311 of the sheet stacking tray 310 by the ejection roller pair 305 as illustrated in FIG. 5. For example, in other words, a sheet P folded in Z-shape has a certain thickness in the sheet conveyance direction (X direction). When the sheet P folded in Z-shape is detected by the ejection port sensor 304, the driving roller 313a and the auxiliary roller 319 start to be driven at the same speed after a predetermined time from the detection timing of the ejection port sensor 304. Driving the driving roller 313a and the auxiliary roller 319, as illustrated in FIG. 6, allows the first sheet P to be conveyed a predetermined distance by the driving roller 313a and the auxiliary roller 319, which are conveyance rollers, and to be stopped.

In the present embodiment, the time until the driving roller 313a and the auxiliary roller 319 start to be driven is the time until the leading edge of the sheet P having passed through the ejection port sensor 304 reaches the auxiliary roller 319, and is determined by the distance from the ejection port of the post-processing apparatus 300 to the output tray 311 and the driving speed of the ejection roller pair 305. In addition, the conveyance distance of the sheet P to the first conveyance belts 313 by the driving roller 313a and the auxiliary roller 319 is set such that about 80% of the length of the sheet P in the sheet conveyance direction overlaps the first conveyance belts 313 according to the size and the width of the sheet P.

Figure 7:
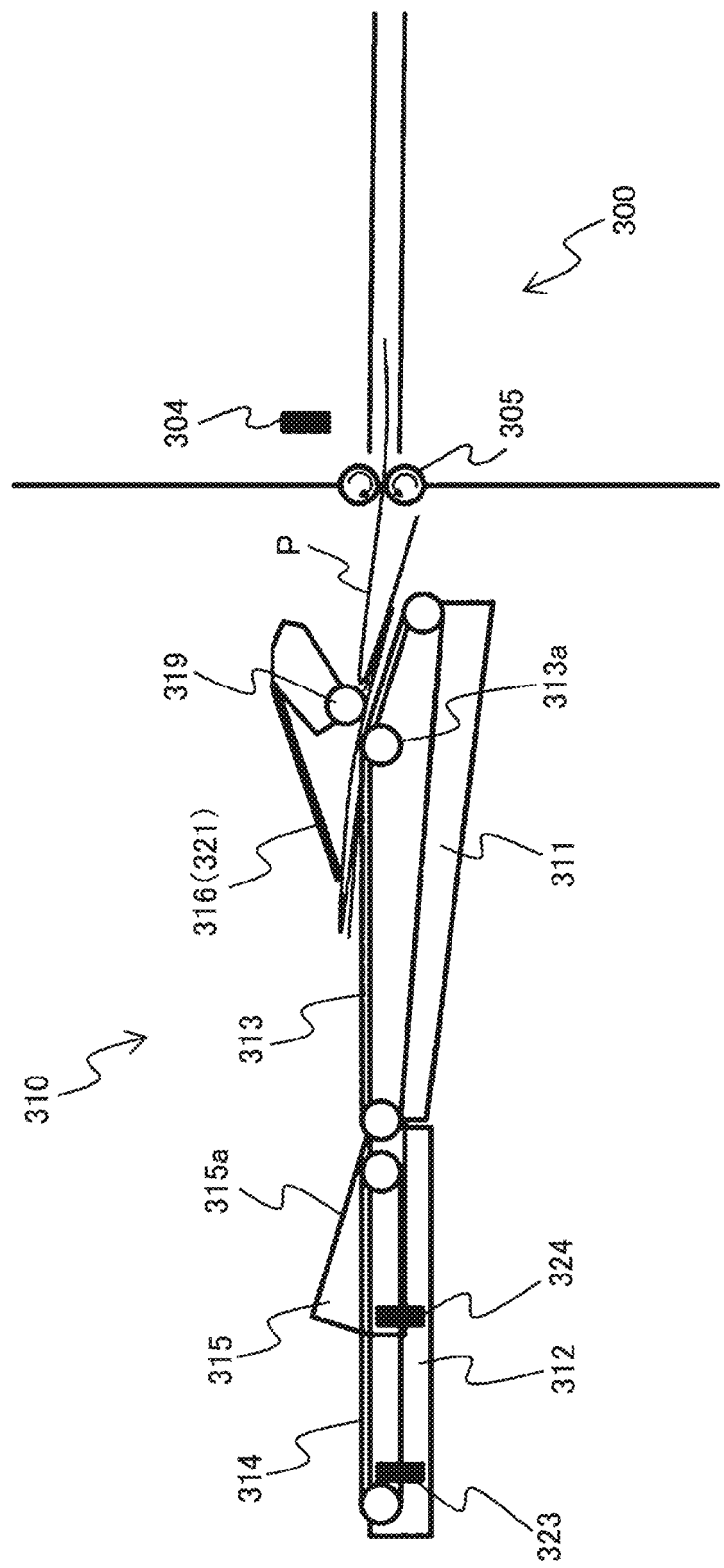
FIG. 7 is a vertical sectional view of a sheet stacking tray and an area around a sheet ejection unit of a post-processing apparatus, and is a diagram illustrating how a second sheet is stacked on an output tray of the sheet stacking tray, according to an embodiment of the present disclosure.

FIG. 7 is a diagram illustrating how a second sheet P is conveyed according to the present embodiment.

The second sheet P is also ejected from the post-processing apparatus 300 in a similar manner to the first sheet P. At this time, the second sheet P is ejected such that the leading edge of the second sheet P contacts the upper surface of the first sheet P.

Figure 8:
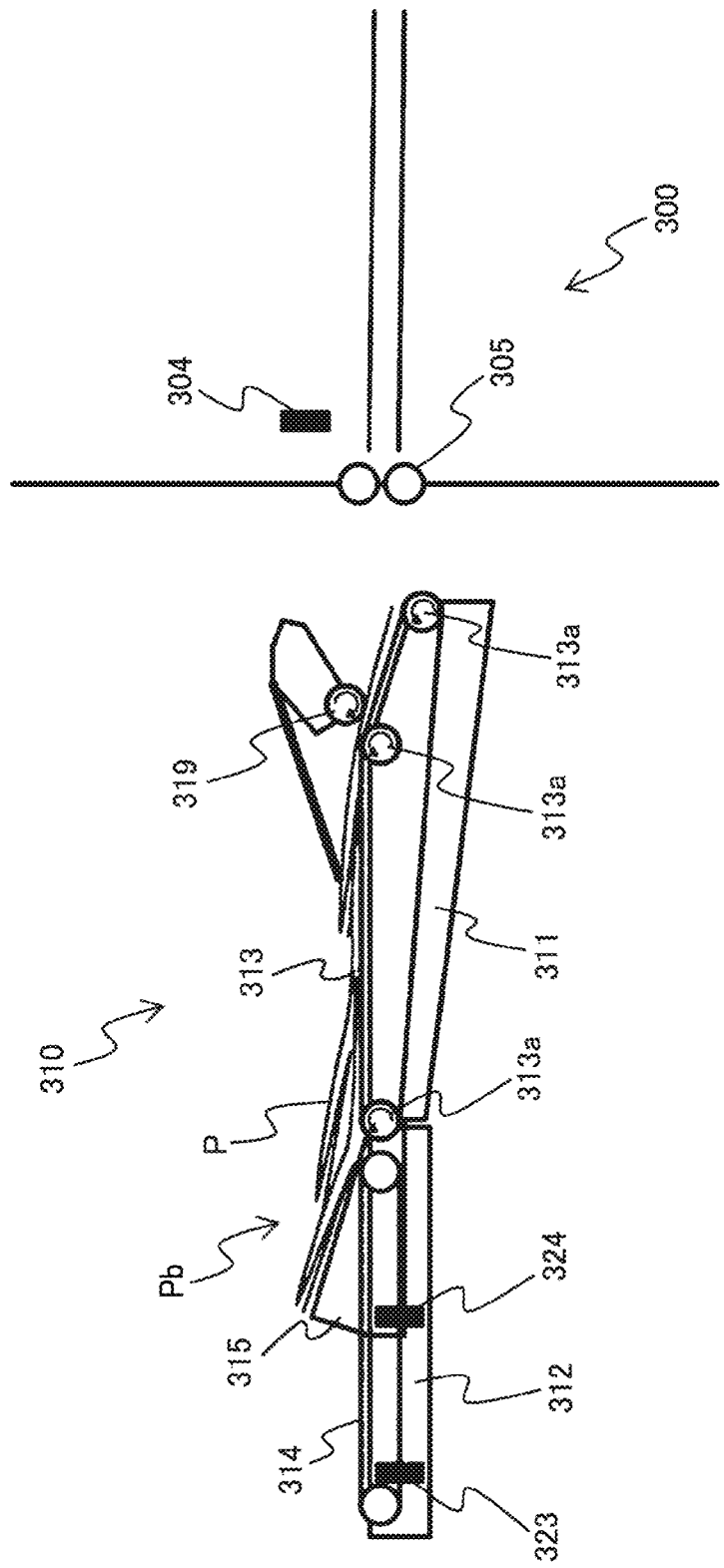
FIG. 8 is a vertical sectional view of a sheet stacking tray and an area around a sheet ejection unit of a post-processing apparatus, and is a diagram illustrating how third and subsequent sheets are stacked on an output tray of the sheet stacking tray, according to an embodiment of the present disclosure.

FIG. 8 is a diagram illustrating how sheets P are stacked on the output tray 311 according to the present embodiment.

As illustrated in FIG. 8, the second sheet P is overlapped on the first sheet P which is previously ejected, and the sheet bundle Pb is formed. Since the sheet bundle Pb according to the present embodiment is formed by stacking the sheets P folded in Z-shape, the thickness of the sheet bundle Pb downstream in the sheet conveyance direction is larger than the thickness of the sheet bundle Pb upstream in the sheet conveyance direction. Accordingly, the sheets P that were ejected in advance overlap from a portion of the sheets P upstream in the sheet conveyance direction of the sheet P on which the stacked sheets P are relatively thin toward a portion of the sheets P on which the stacked sheets P are thick. Thus, the sheet bundle Pb is formed. When the operations illustrated in FIGS. 5, 6, and 7 are repeated, the leading (first) sheet P conveyed by the first conveyance belts 313 is sequentially pushed toward downstream in the sheet conveyance direction by the subsequent sheets P (second and subsequent sheets P) and moves to a position at which the leading sheet P abuts against the receiving surfaces 315a of the pair of sheet stoppers 315. At this time, the movement of the leading (first) sheet P is stopped by the receiving surfaces 315a. The subsequent sheet P is also sequentially stopped by the pair of sheet stoppers 315 in a similar manner to the leading (first) sheet P. In other words, the sheet bundle Pb formed on the output tray 311 is blocked by the receiving surfaces 315a. Accordingly, the following sheets P sequentially conveyed later are stacked one after another on the preceding sheets P to form the sheet bundle Pb, and the sheet bundle Pb gradually assumes an upright posture due to accumulation of a thickness difference in the sheet conveyance direction of the sheet bundle Pb. Such a configuration as described above allows the stacking amount of the sheet bundle Pb on the output tray 311 to be increased, and the stacking efficiency of the sheet bundle Pb per unit distance to be enhanced.

Figure 9:
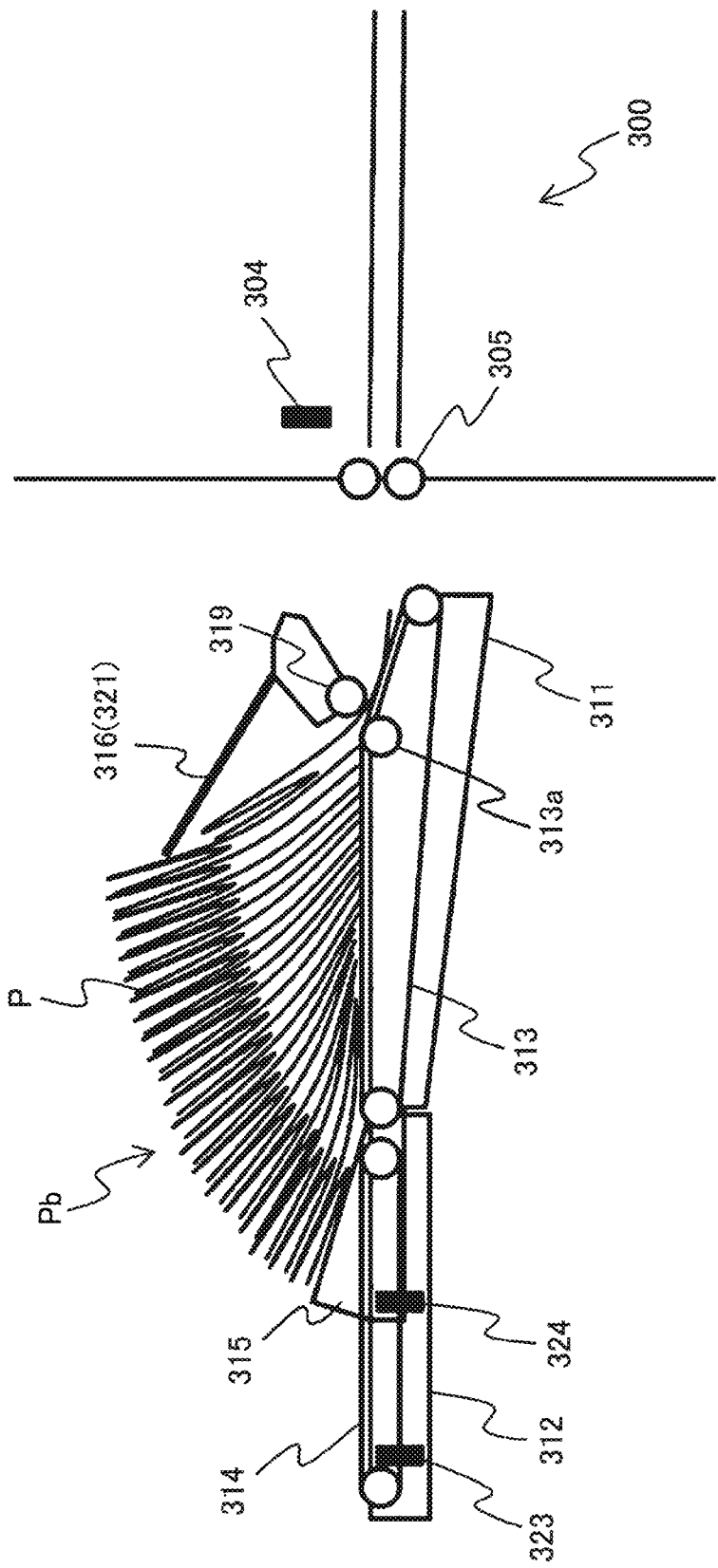
FIG. 9 is a vertical sectional view of a sheet stacking tray and an area around a sheet ejection unit of a post-processing apparatus, and is a diagram illustrating how an output tray of the sheet stacking tray is fully loaded as a large number of sheets are stacked on the output tray and form a sheet bundle, according to an embodiment of the present disclosure.

FIG. 9 is a diagram illustrating how the sheet bundle Pb is fully loaded on the output tray 311, according to the present embodiment.

When the number of sheets P blocked by the pair of sheet stoppers 315 increases and the sheet bundle Pb is thick, the sheets P included in the sheet bundle Pb on a rear end of the sheet bundle Pb pushes up the detection jogger 321 of the sheet surface detector 316. When the sheet bundle Pb formed with the pair of sheet stoppers 315 as the leading end of the sheet bundle Pb reaches the upper limit of stacking on the output tray 311, the detection jogger 321 is lifted to a predetermined angle. At this time, an operation signal is output from the sheet surface detector 316. Thus, it is detected by this operation signal that the sheet bundle Pb in the output tray 311 is fully loaded.

Figure 10:
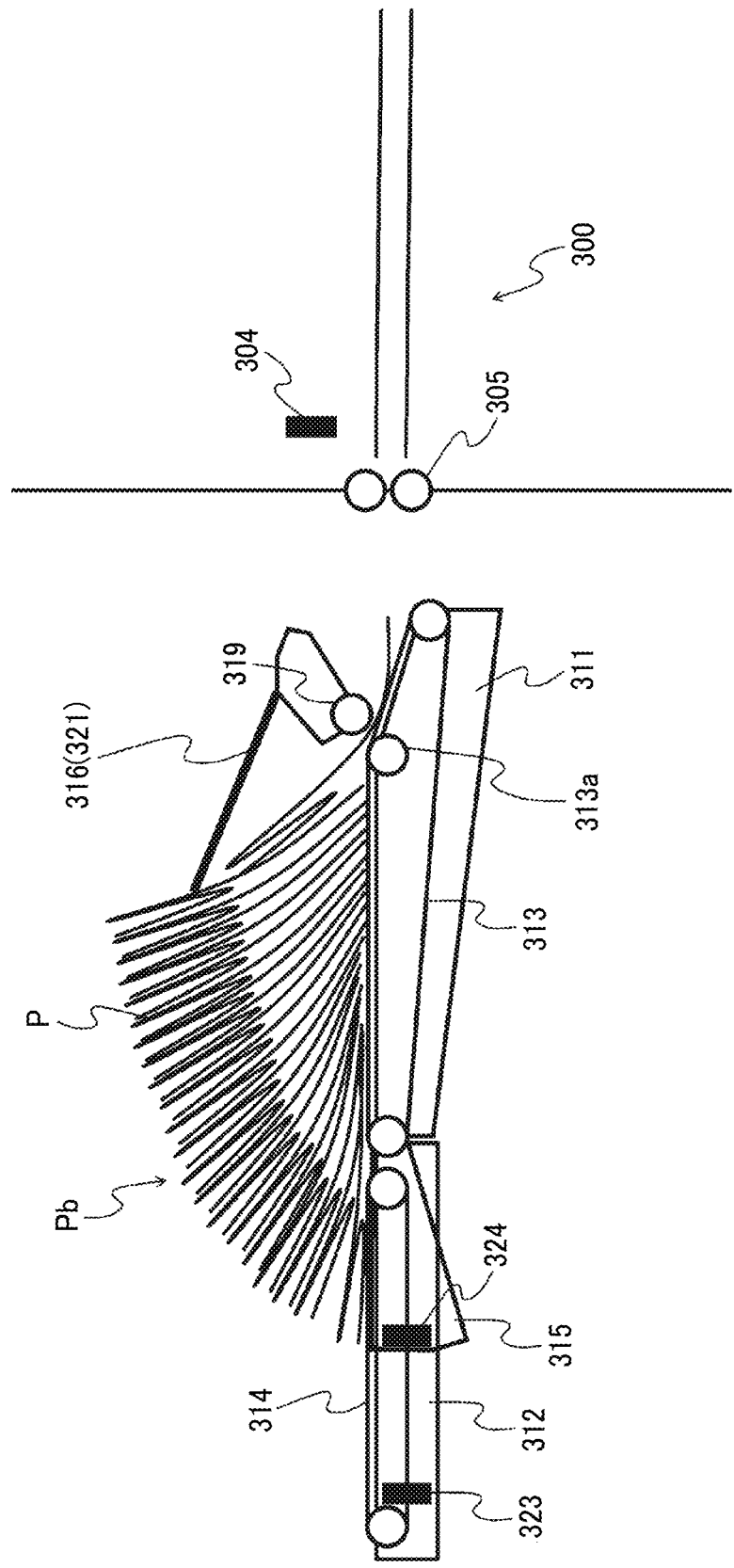
FIG. 10 is a vertical sectional view of a sheet stacking tray and an area around a sheet ejection unit of a post-processing apparatus, and is a diagram illustrating how a sheet bundle is permitted to move to an extension tray of the sheet stacking tray, according to an embodiment of the present disclosure.

FIG. 10 is a diagram illustrating how the sheet bundle Pb stacked or placed on the output tray 311 is permitted to move to the extension tray 312, according to the present embodiment.

When an operation signal that detects that the extension tray 312 is fully loaded, is output from the sheet surface detector 316 serving as the first status detector, the pair of sheet stoppers 315 are pivotable between the protruding position and the lowered position by the driving of the third motor. Accordingly, the receiving surfaces 315a of the pair of sheet stoppers 315 are parallel to the upper surface of the extension tray 312 at a substantially equivalent height. Thus, the sheet bundle Pb blocked by the pair of sheet stoppers 315 falls down toward the sheet conveyance direction as a whole. Accordingly, the sheet bundle Pb comes into contact with the second conveyance belt 314. In addition, the sheet bundle Pb falls down toward the sheet conveyance direction, a rearmost sheet P that has pushed up the detection jogger 321 also moves downstream in the sheet conveyance direction. Thus, the detection jogger 321 pivots downward by its own weight. Accordingly, when the operation signal is not output from the sheet surface detector 316, the sheet bundle Pb blocked by the pair of sheet stoppers 315 is allowed to move to the extension tray 312.

Figure 11:
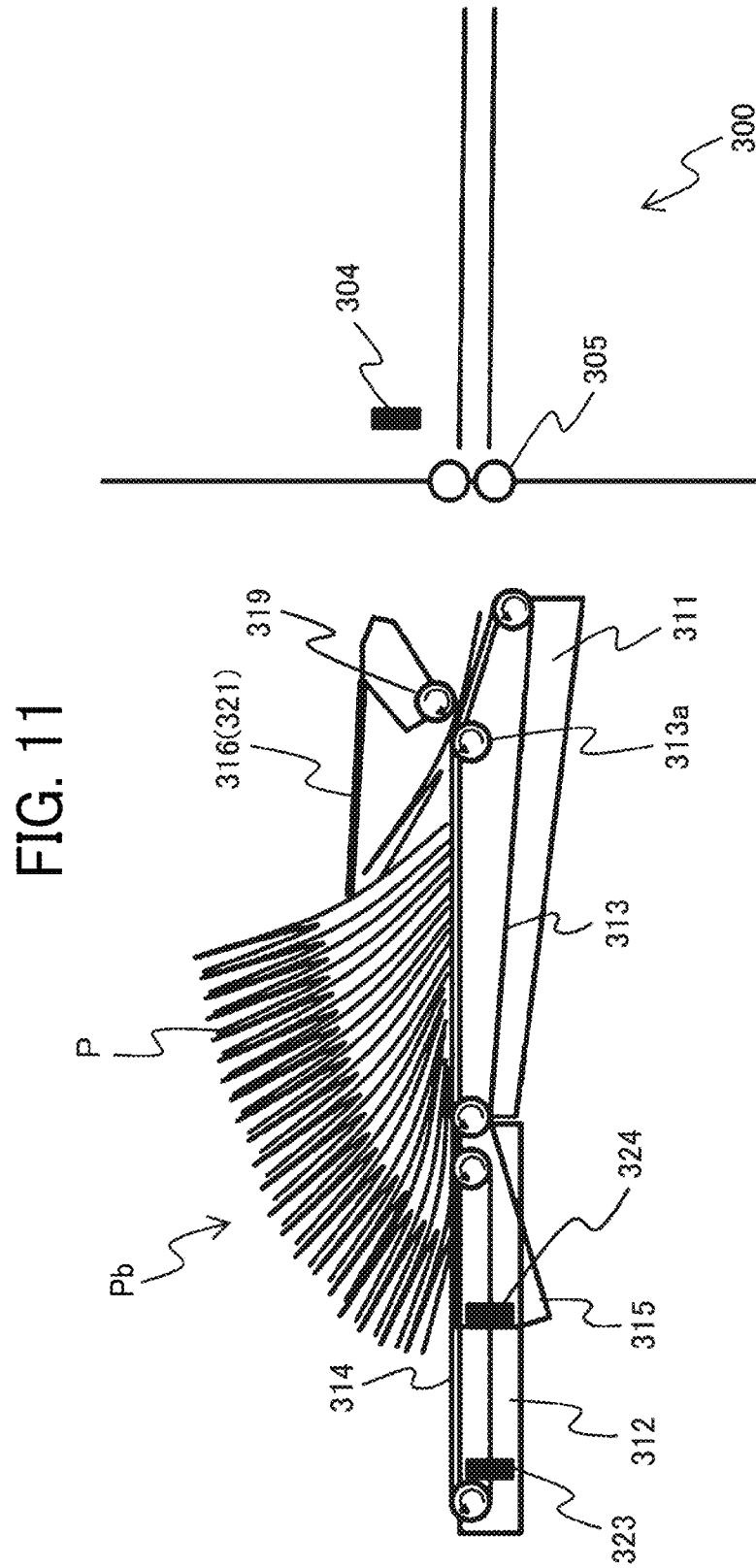
FIG. 11 is a vertical sectional view of a sheet stacking tray and an area around a sheet ejection unit of a post-processing apparatus, and is a diagram illustrating how a sheet bundle starts to move to an extension tray, according to an embodiment of the present disclosure.

FIG. 11 is a diagram illustrating how the sheet bundle Pb starts to move to the extension tray 312, according to the present embodiment.

When the pair of sheet stoppers 315 shifts to the lowered position, the leading sheet P comes into contact with the upper surface of the second conveyance belt 314. In this state, driving both the first conveyance belts 313 and the second conveyance belt 314 allows the sheet bundle Pb, which is a group of sheets P, to be conveyed toward the leading end of the extension tray 312. Accordingly, a space is secured between the rear side of the sheet bundle Pb and the auxiliary roller 319, so that further succeeding sheets P can be ejected from the post-processing apparatus 300 to the output tray 311. Owing to such a configuration, the stacking amount of the sheet bundle Pb per unit distance in the sheet conveyance direction can be further enhanced.

At this time, the first conveyance belts 313 and the second conveyance belt 314 are driven at a speed lower than the sheet conveyance speed inside the post-processing apparatus 300. Accordingly, the inertia force when the sheet bundle Pb conveyed by the sheet stacking tray 310 stops is restrained. Thus, the deviation of the position of the sheet bundle Pb can be reduced and the alignment accuracy when the sheet bundle Pb is stacked can be enhanced. The second conveyance belt 314 is driven at a speed lower than the speed of the first conveyance belts 313. The sheet bundle Pb conveyed on the extension tray 312 moves at a speed lower than the speed of the sheet bundle Pb conveyed on the output tray 311.

Figure 12:
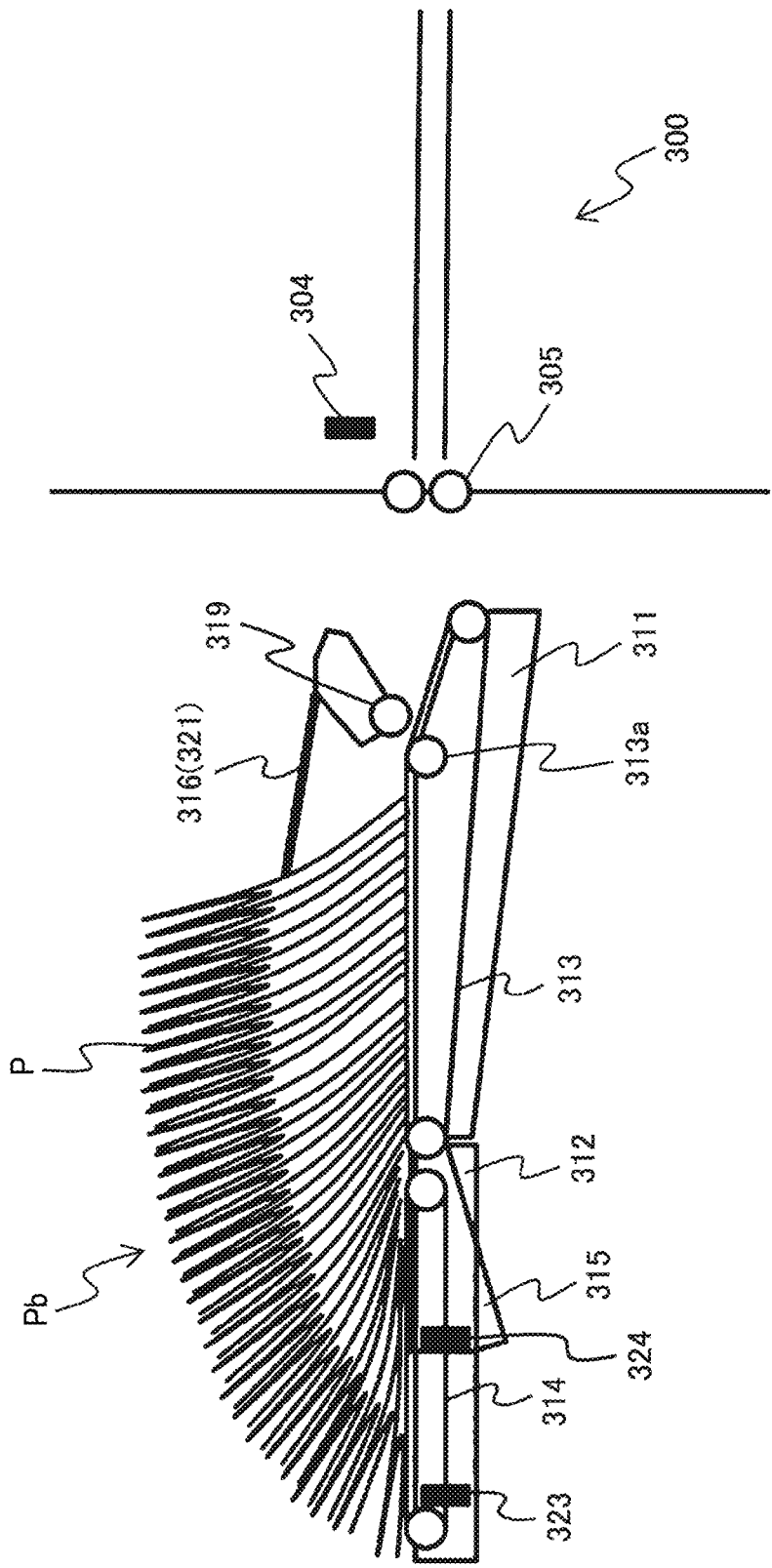
FIG. 12 is a vertical sectional view of a sheet stacking tray and an area around a sheet ejection unit of a post-processing apparatus, and is a diagram illustrating how an output tray of the sheet stacking tray is fully loaded as a sheet bundle on the sheet stacking tray further increases in amount, according to an embodiment of the present disclosure.

FIG. 12 is a diagram illustrating how the entire sheet bundle Pb stacked on the output tray 311 is fully loaded, according to the present embodiment.

When the leading sheet P conveyed by the second conveyance belt 314 reaches the end of a downstream portion in the sheet conveyance direction, the first sheet detection element 323 detects the arrival of the leading sheet P and outputs an operation signal. When the operation signal that detects the arrival of the leading sheet P is output from the first sheet detection element 323, driving of the second conveyance belt 314 is stopped and driving of only the first conveyance belts 313 is continued.

Accordingly, the position of the leading sheet P does not move and the subsequent sheets P are stacked one after another. Thus, the sheet bundle Pb gradually assumes an upright posture on the output tray 311 and the extension tray 312. When the detection jogger 321 of the sheet surface detector 316 is pushed up to a predetermined angle, the operation signal is output again from the sheet surface detector 316. At this time, it is determined that the sheet bundle Pb on the sheet stacking tray 310 is fully loaded. Thus, the driving of both the first conveyance belts 313 and the second conveyance belt 314 is stopped and the ejection operation from the post-processing apparatus 300 to the sheet stacking tray 310 is ended. However, only when the image forming apparatus 100 is operated to perform a predetermined setting, control to continue the ejection operation, the sheet stacking, and the sheet conveyance can be performed even after the full-load status is detected. Thus, the stacked sheets can be fed to, for example, a peripheral device, a box downstream of the sheet stacking tray 310.

Figure 13:
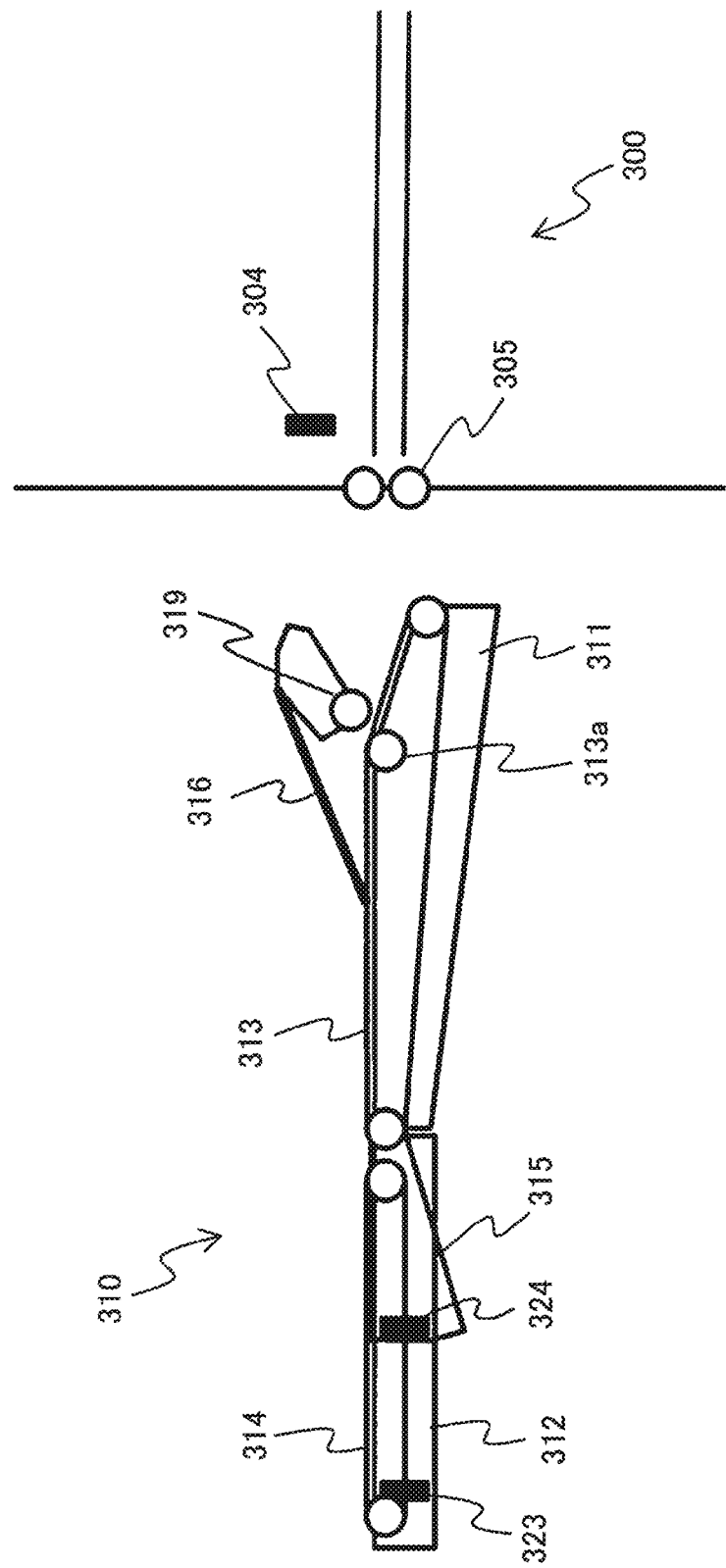
FIG. 13 is a vertical sectional view of a sheet stacking tray and an area around a sheet ejection unit of a post-processing apparatus, and is a diagram illustrating a condition to be me for a pair of sheet stoppers to return to an initial position after a sheet is ejected, according to an embodiment of the present disclosure.

FIG. 13 is a diagram illustrating a condition to be met for the pair of sheet stoppers 315 to return to the initial position after the sheet P is ejected, according to the present embodiment.

When the sheet bundle Pb stacked on the output tray 311 and the extension tray 312 is removed after the end of the above-described ejection operation, the detection jogger 321 pivots and returns to the position at which the detection jogger 321 contacts the output tray 311. Thus, the operation signal is not output from the sheet surface detector 316. As a result, there is no sheet P (sheet bundle Pb) immediately above the second sheet detection element 324. Thus, the operation signal is not output from the second sheet detection element 324.

As described above, when both the sheet surface detector 316 and the second sheet detection element 324 no longer detect the sheet P or the sheet bundle Pb, the third motor is driven in the reverse direction to pivot and shift the pair of sheet stoppers 315 from the lowered position to the protruding position. Thus, the pair of sheet stoppers 315 return to the initial position as illustrated in FIG. 3. In a case in which an operation signal is output from one of the sheet surface detector 316 and the second sheet detection element 324 when the pair of sheet stoppers 315 are at the lowered positions. In other words, when the sheet P (the sheet bundle Pb) remains on the output tray 311 or on the extension tray 312, a warning that prompts a user to remove the remaining sheet P is notified on the display screen of the operation panel 106 provided in the image forming apparatus 100.

In the present embodiment, as the condition when the pair of sheet stoppers 315 can return to the initial positions, the first sheet detection element 323 may be added to the sheet surface detector 316 and the second sheet detection element 324, and the pair of sheet stoppers 315 may be returned to the protruding position when all these devices including the first sheet detection element 323, the sheet surface detector 316 and the second sheet detection element 324 no longer detect the sheet P or the sheet bundle Pb. With such a configuration, the detection range of the remaining sheets P on the extension tray 312 extends over the entire sheet conveyance direction of the second conveyance belt 314. Thus, the operation to return the pair of sheet stoppers 315 to the initial positions can be performed more reliably.

Figure 14:
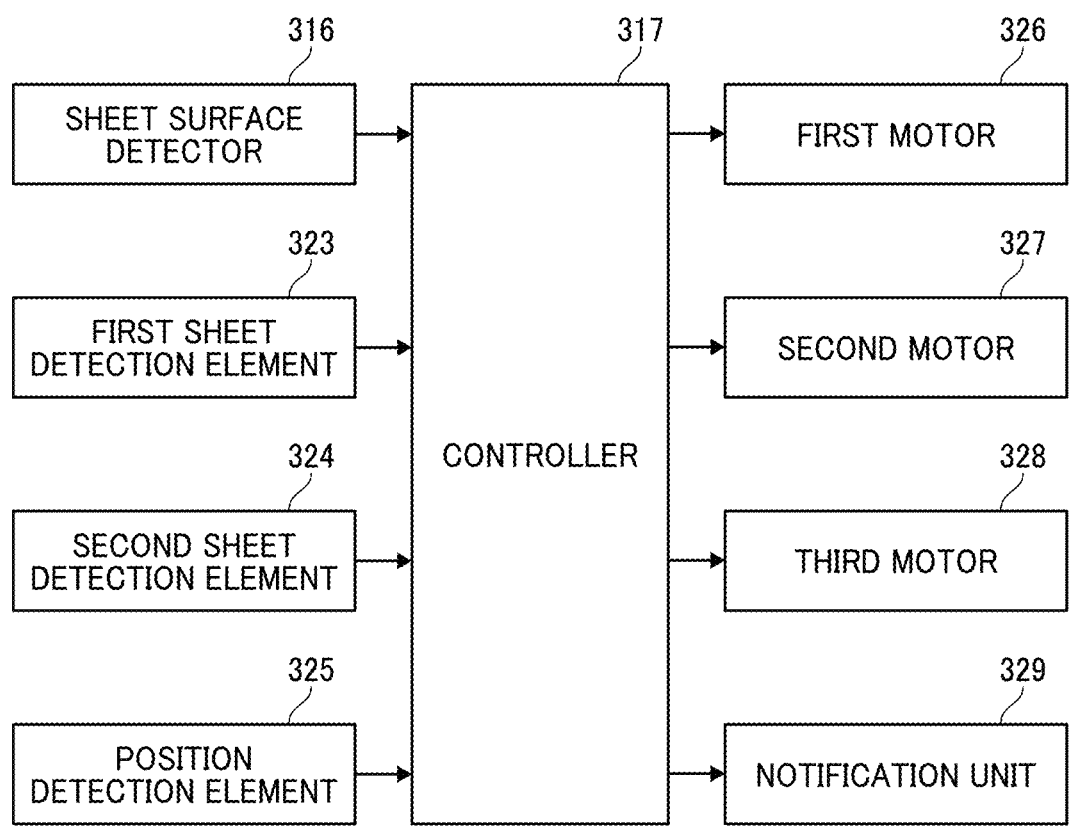
FIG. 14 is a block diagram of a controller provided for a sheet stacking apparatus to drive the sheet conveyance driving operation of a sheet stacking tray, according to an embodiment of the present disclosure.

Next, the controller 317 as a controller provided for the post-processing apparatus 300 is described. The controller 317 according to the present embodiment includes a microcomputer including, for example, a central processing unit (CPU), a read only memory (ROM), a random access memory (RAM), and is connected to the main controller 107 so as to communicate with the main controller 107 provided for the image forming apparatus 100. FIG. 14 is a block diagram of the controller 317 according to the present embodiment. As illustrated in FIG. 14, the above-described sheet surface detector 316, the first sheet detection element 323, the second sheet detection element 324, and the above-described position detection element 325 are connected to the input side of the controller 317. On the other hand, a first motor 326 which is a driving source of the first conveyance belts 313, a second motor 327 which is a driving source of the second conveyance belt 314, a third motor 328 which is a driving source of the pair of sheet stoppers 315, and a notification unit 329 are connected to an output side of the controller 317.

The controller 317 controls driving of the first motor 326, the second motor 327, and the third motor 328 based on operation signals from the sheet surface detector 316 and the first sheet detection element 323. The controller 317 executes conveyance driving process of the sheet P (sheet bundle Pb) ejected from the post-processing apparatus 300 to the sheet stacking tray 310. The conveyance driving process performed by the controller 317 is described below with reference to the flowchart FIG. 15.

Figure 15:
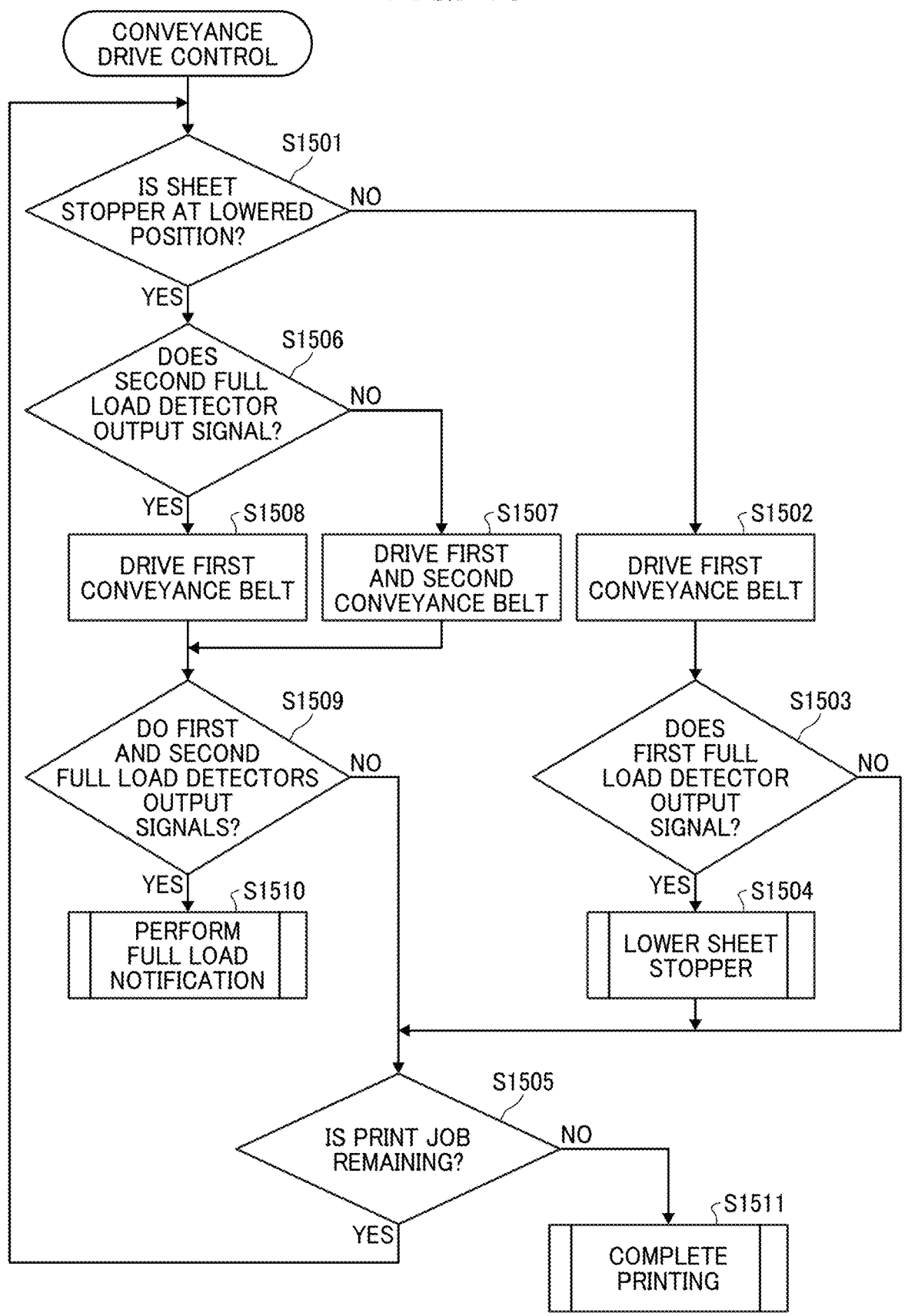
FIG. 15 is a flowchart of the processes performed by a controller to drive the sheet conveyance operation of a sheet stacking tray, according to an embodiment of the present disclosure.

FIG. 15 is a flowchart of the processes performed by the controller 317 to determine which one of the first conveyance belt 313 or the second conveyance belt 314 is to be operated to drive the sheet conveyance operation of the sheet stacking tray 310, according to the present embodiment. Which conveyor is to be operated changes depending on the reaction of the pair of sheet stoppers 315 and the first sheet detection element 323 and is determined during the ejection operation from the post-processing apparatus 300.

As illustrated in FIG. 15, first, whether the pair of sheet stoppers 315 are at the lowered position is determined based on the detection signal of the position detecting element 325 (S1501). If the pair of sheet stoppers 315 are at the protruding position and are not lowered (NO in S1501), only the first conveyance belts 313 are driven by the first motor 326 and the sheets P ejected from the post-processing apparatus 300 are sequentially conveyed by the first conveyance belts 313 (S1502).

When the conveyance operation of the sheets P by the first conveyance belt 313 is started, whether the sheet surface detector 316 that serves as a first full-load detector has output an operation signal is determined (S1503). When the operation signal that detects the full-load status is output from the sheet surface detector 316 (YES in S1503), the third motor 328 is driven to shift the pair of sheet stoppers 315 to the lowered position (S1504). Then, the process proceeds to step S5 to determine whether a print job remains. If the print job remains (YES in S1505), the process returns to step S1501 and continues. When the operation signal is not output from the sheet surface detector 316 (NO in S1503), the process proceeds to step S1505 to determine whether the print job remains. When the print job remains, the process is continued.

On the other hand, in step S1501, when it is determined that the pair of sheet stoppers 315 are at the lowered positions (YES in S1501), whether the first sheet detection element 323 that serves as the second full-load status detector has output the operation signal is determined (S1506). When the operation signal is not output from the first sheet detection element 323 (NO in S1506), both the first motor 326 and the second motor 327 are driven and the entire sheet bundle Pb is conveyed by the first conveyance belts 313 and the second conveyance belt 314 (S1507).

On the other hand, when the operation signal that detects the arrival of the sheet bundle Pb is output from the first sheet detection element 323 (YES in S1506), the second motor 327 is stopped and the second conveyance belt 314 is not moved to prevent the sheet bundle Pb from falling from the sheet stacking tray 310. Thus, only the first conveyance belts 313 are driven by the first motor 326 to convey the sheet bundle Pb (S1508).

Then, whether both the sheet surface detector 316 as the first full-load status detector and the first sheet detection element 323 as the second full-load status detector have output operation signals is determined (S1509). If it is determined that both the sheet surface detector 316 and the first sheet detection element 323 have output operation signals for detecting the full-load status (YES in S1509), the driving of not only the second conveyance belt 314, but also the first conveyance belts 313 is stopped. Then, the process proceeds to step S1510 to perform full-load status notification. In the full-load notification, the full-load notification is notified to the operation panel 106 of the image forming apparatus 100 via the notification unit 329 such that no more sheets P are to be stacked on the sheet stacking tray 310.

In step S9, if the operation signals are not output from both the sheet surface detector 316 and the first sheet detection element 323 (NO in S1509), the process proceeds to step S1505 to determine whether a print job remains. If a print job remains, the process is continued. If it is determined in step S1505 that all the print jobs have been executed (NO in S1505), the process proceeds to step S1511 to perform print end process.

Figure 16:
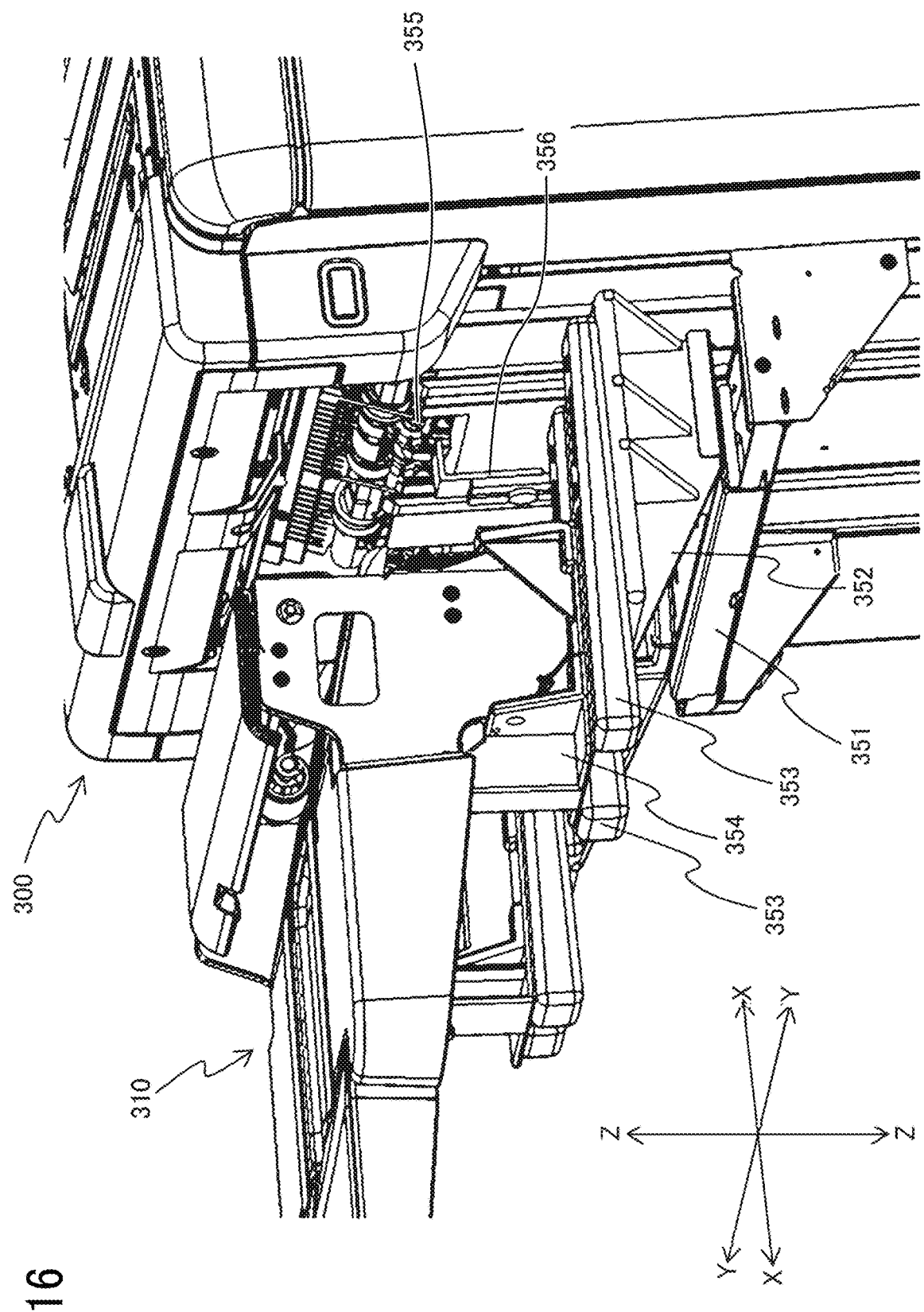
FIG. 16 is a perspective view of a connection portion between a sheet stacking tray and an area around the sheet ejection unit of a post-processing apparatus, according to an embodiment of the present disclosure.

FIG. 16 is a perspective view of a connecting portion between the sheet stacking tray 310 and an area around the ejection portion of the post-processing apparatus 300, according to the present embodiment. The post-processing apparatus 300 includes a lifter 351, and a supporter 352 is mounted on the lifter 351. Holders 353 are connected to the supporter 352, and a coupler 354 is connected to the holders 353 and the sheet stacking tray 310. The holders 353 can be connected to an arbitrary position in the sheet width direction (Y direction) on the supporter 352 and adjust the position of the sheet stacking tray 310 in the sheet width direction. The coupler 354 can be connected to an arbitrary position in the sheet conveyance direction (X direction) on the holders 353 and adjust the distance between the sheet stacking tray 310 and the ejection roller pair 305 of the post-processing apparatus 300.

The lifter 351 can be moved in the vertical direction (Z direction) by a motor. The lifter 351 is lifted to a position at which the sheet surface detector 355 comes into contact with one of other units when the image forming apparatus 100 is started. A vertical position reference unit 356 is connected to the supporter 352, and the vertical position of the sheet stacking tray 310 can be adjusted by vertically adjusting the vertical position reference unit 356 to change a contact position with the sheet surface detector 355.

The position of the sheet stacking tray 310 with respect to the post-processing apparatus 300 is changed depending on the shape of the sheet P to be ejected. At this time, the interval between the ejection roller pair 305 in the post-processing apparatus 300 and the conveyance roller (the driving roller 313a and the auxiliary roller 319) in the sheet stacking tray 310 is set such that the ejected sheet P can contact either the ejection roller pair 305 or the auxiliary roller 319, and such that the sheet P is sufficiently separated so as not to be damaged by deflection caused by the difference in driving speed between the ejection roller pair 305 and the auxiliary roller 319.

The leading edge of the ejected sheet P lands on the output tray 311 on an upstream side of the auxiliary roller 319 in the sheet conveyance direction in accordance with the properties of the sheet P. For example, when a large sheet P is ejected, the holders 353 are moved downstream in the sheet conveyance direction, and the sheet stacking tray 310 is disposed at a position away from the post-processing apparatus 300. When a relatively thick sheet P is ejected, the sheet P has higher rigidity than a relatively thin sheet P of the same size and is less likely to hang down after being ejected from the ejection roller pair 305. Thus, the vertical position reference unit 356 is lowered to raise the position of the sheet stacking tray 310. The position adjustment of the sheet stacking tray 310 as described above is not limited to the manual operation. However, the position of the sheet stacking tray 310 may be automatically adjusted based on the data of an appropriate position calculated in advance according to the sheet size and the type of the folding process by using a driving device including a motor or the like.

As described above, in the sheet stacking tray 310 according to the present embodiment, the folded sheets P ejected from the post-processing apparatus 300 are stacked on the output tray 311 by a predetermined amount while being overlapped in a roof tile shape and are blocked by the pair of sheet stoppers 315 to form the sheet bundle Pb. Then, when the sheet bundle Pb, which is a group of sheets P having the pair of sheet stoppers 315 as the leading ends of the group of sheets P, is in a standing posture, the pair of sheet stoppers 315 are released from blocking the sheets P, and the sheet bundle Pb is continuously ejected while being moved on the output tray 311 and the extension tray 312 as a whole. Accordingly, the sheets P to be subsequently ejected can be stacked in a state in which the stacking efficiency is similarly high. In addition, the number of stackable sheets having the thickness difference ejected from the post-processing apparatus 300 can be increased without lowering the alignment accuracy while preventing the ejection failure due to the thickness difference of the accumulated sheets P.

The present disclosure is not limited to the above-described embodiments, and various modifications can be made without departing from the technical spirit of the present disclosure. While the above-described embodiments illustrate a preferable example, those skilled in the art can realize various modifications from the disclosed contents. Such modifications are within the technical scope of the present disclosure.

In the above descriptions, the term "printing" in the present disclosure may be used synonymously with, e.g. the terms of "image formation", "recording", "printing", and "image printing".

Any one of the above-described operations may be performed in various other ways, for example, in an order different from the one described above.

What is claimed is:

1. A sheet stacking tray comprising:
   a first conveyor configured to sequentially convey a plurality of sheets ejected to the sheet stacking tray, in a sheet conveyance direction to form a sheet bundle;
   a second conveyor disposed downstream from the first conveyor in the sheet conveyance direction;
   a sheet stopper pivotable between a protruding position and a lowered position, the sheet stopper being configured to block the plurality of sheets conveyed by the first conveyor to form the sheet bundle when the sheet stopper is at the protruding position, the sheet stopper being configured to allow the formed sheet bundle to pass when the sheet stopper is at the lowered position;
   a first full-load detector configured to detect that the sheet bundle blocked by the sheet stopper is fully loaded; and
   a second full-load detector configured to detect that a leading edge of the sheet bundle conveyed by the second conveyor has reached a downstream end portion of the second conveyor in the sheet conveyance direction;
   a plurality of motors configured to:
      maintain the sheet stopper at the protruding position to block the sheet conveyed by the first conveyor until the first full-load detector outputs a signal indicating that the sheet bundle is fully loaded;
      shift the sheet stopper to the lowered position to allow the sheet bundle to pass when the first full-load detector outputs the signal indicating that the sheet bundle is fully loaded;
      drive the first conveyor and the second conveyor together to convey the sheet bundle when the sheet stopper shifts to the lowered position; and
      stop the second conveyor and drive only the first conveyor, when the second full-load detector detects the leading edge of the sheet bundle.

2. The sheet stacking tray according to claim 1, wherein the plurality of motors are configured to shift the sheet stopper from the lowered position to the protruding position when both the first full-load detector and the second full-load detector do not detect a sheet after the sheet stopper is shifted to the lowered position.

3. The sheet stacking tray according to claim 1, wherein the plurality of motors are configured to drive the second conveyor at a speed lower than a speed of the first conveyor when both the first conveyor and the second conveyor convey a sheet.

4. The sheet stacking tray according to claim 1, wherein the plurality of motors are configured to drive the first conveyor and the second conveyor to convey the sheet bundle at a speed lower than a sheet conveyance speed of a sheet ejected to the sheet stacking tray.

5. The sheet stacking tray according to claim 1, further comprising:

an output tray on which the first conveyor is disposed; and an extension tray on which the second conveyor is disposed, the extension tray being coupled to the output tray, and wherein the sheet stopper is disposed on an upstream side of the extension tray in the sheet conveyance direction.

6. The sheet stacking tray according to claim 5, wherein the sheet stopper includes a pivotable member having a receiving surface and is pivotable between the protruding position at which the receiving surface is inclined with respect to an upper surface of the extension tray and the lowered position at which the receiving surface is parallel to the upper surface of the extension tray.

7. The sheet stacking tray according to claim 5, wherein the first conveyor includes a plurality of first conveyance belts arranged in parallel at intervals in a direction perpendicular to the sheet conveyance direction, wherein the sheet stopper and another sheet stopper are disposed downstream from the plurality of first conveyance belts in the sheet conveyance direction, and wherein the second conveyor includes a second conveyor disposed between the sheet stopper and said another sheet stopper.

8. A sheet stacking apparatus comprising:

the sheet stacking tray according to claim 1; and a controller configured to control driving of the first conveyor, the second conveyor, and the sheet stopper of the sheet stacking tray.

9. An image forming system comprising:

an image forming apparatus configured to form an image on a sheet;

a post-processing apparatus configured to fold the sheet on which the image has been formed by the image forming apparatus; and the sheet stacking apparatus according to claim 8 configured to stack the sheet folded by the post-processing apparatus.

* * * * *